(12) United States Patent
Boghjalian et al.

(10) Patent No.: US 8,442,495 B2
(45) Date of Patent: May 14, 2013

(54) SYSTEM AND METHOD FOR VOICE MESSAGING

(76) Inventors: Sarkis Boghjalian, Sunnyside, NY (US); Reza Jalili, Sandy, UT (US)

(*) Notice: Subject to any disclaimer, the term of this patent is extended or adjusted under 35 U.S.C. 154(b) by 895 days.

(21) Appl. No.: 12/538,136

(22) Filed: Aug. 8, 2009

(65) Prior Publication Data

US 2011/0034153 A1 Feb. 10, 2011

(51) Int. Cl.
*H04M 11/10* (2006.01)
(52) U.S. Cl.
USPC ........ 455/413; 455/412.1; 455/466; 455/455; 379/88.13
(58) Field of Classification Search .................. 455/413, 455/412.1, 466, 455; 379/88.13, 88.14
See application file for complete search history.

(56) References Cited

U.S. PATENT DOCUMENTS

| | | | |
|---|---|---|---|
| 6,813,489 B1* | 11/2004 | Wu et al. | 455/412.1 |
| 8,180,382 B1* | 5/2012 | Graefen | 455/466 |
| 2010/0184409 A1* | 7/2010 | Doulton | 455/412.1 |

* cited by examiner

*Primary Examiner* — Kamran Afshar
*Assistant Examiner* — Shahriar Behnamian

(57) ABSTRACT

A system and method for voice messaging the enables the modification of recorded voice messages and caller-specific conveniences. More particularly, the present invention pertains to identifying a caller and, thereby, enabling the caller to modify recorded voice messages and enabling a recipient to designate how calls from a particular caller should be handled, for example, by specifying a greeting message for a particular caller or by specifying the order in which voice messages are presented based upon the associated caller.

17 Claims, 4 Drawing Sheets

SYSTEM AND METHOD FOR VOICE MESSAGING

TECHNICAL FIELD

The present invention generally pertains to the communication and receipt of voice messages within a telephone communication system.

BACKGROUND

Current voice messaging systems do not enable a caller to modify or delete a recorded message once the caller has disconnected from the system. For example, a caller may leave a voice message, hang up, and then realize that he forgot to include certain information in the message. In order to provide this information, the caller has to leave a second voice message. This can be frustrating for both the caller, who may be embarrassed for leaving multiple messages, and the recipient, who has to listen to multiple messages in order to obtain all the information.

Additionally, current voice messaging systems do not provide caller-specific conveniences. For instance, current voice messaging systems do not allow an individual to establish greeting messages for particular callers. Although a person may record and store multiple greeting messages, more than one greeting message cannot be enabled at the same time. For example, a business person can record a greeting message appropriate for calls received during business hours (e.g., "We are currently helping other customers and will respond shortly.") and a greeting message appropriate for after-hours calls (e.g., "We are currently closed. Our business hours are . . . ") and can set a schedule with the voice messaging system so that the appropriate message is played at particular times of the day. However, an individual may desire to set a particular greeting for a specific caller. For example, an individual may be expecting a call from a friend, but an unexpected event may prevent him from taking the call. Current voice message systems do not enable the individual to set a particular greeting for this friend.

Furthermore, current voice messaging system lack a way to for a user to customize the order in which his voice messages are presented. Typically, voice messages are presented to the user in the order in which they were received. This can be frustrating for a person wanting to listen to a message from a particular caller before any others. For example, if a sale representative has received multiple voice messages, but wants to hear those from a particular client first, he has to navigate through each message, listening to each one at least in part so that he can determine which message is from the sought after client.

What is needed is a system and method for voice messaging that enables individuals to modify their recorded voice messages and to provide functionality customized to specific callers.

SUMMARY

The present invention addresses the aforementioned needs by providing a system and method for voice messaging the enables the modification of recorded voice messages and caller-specific conveniences. More particularly, the present invention pertains to identifying a caller and, thereby, enabling the caller to modify recorded voice messages and enabling a recipient to designate how calls from a particular caller should be handled, for example, by specifying a greeting message for a particular caller or by specifying the order in which voice messages are presented based upon the associated caller. The present invention further pertains to a user interface that simplifies the task of interacting with a voice messaging system.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

Figure 1:
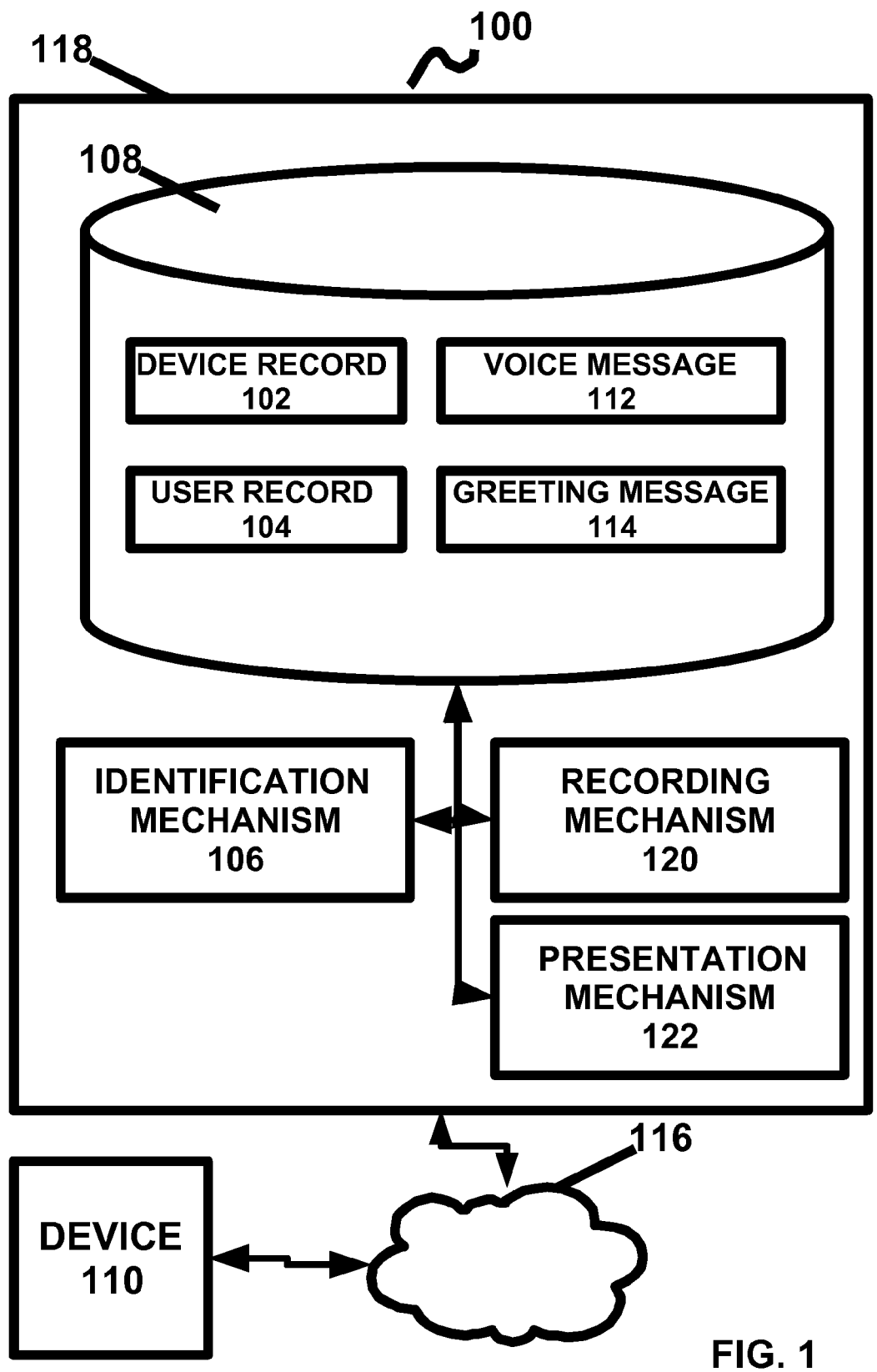
FIG. 1 illustrates a general architecture overview of an embodiment of a system of the present invention.

FIG. 1 illustrates a general architecture overview of an embodiment of the voice message system 100 of the present invention. The voice message system 100 can include a voice message system server (VMSS) 118 which can be a component of a larger telecommunications system or can be an independent system. For example, the VMSS 118 can be part of a telephone service provider's telecommunication system or the VMSS 118 can be managed by a third-party service that interacts with such a system. The VMSS 118 can include a database 108 for storing system records, including device records 102 and user records 104, and related data, such as voice messages 112 and greeting messages 114. The VMSS 118 can include a recording mechanism 120 to enable the recording of voice messages 112 and greeting messages 114 and can also include a presentation mechanism 122 to enable the presentment of such messages. Although only one instance of each element is illustrated in FIG. 1, this is for illustrative purposes only and it is to be understood that the VMSS 118 can include a plurality of such components (e.g., multiple databases storing multiple records and messages). Furthermore, it is to be understood that voice messages 112 and greeting messages 114 can be stored in association with a system record, and thereby contained in the appropriate record or indexed with the relevant record, as appropriate per the particular implementation of the invention. The VMSS 118 can include an identification mechanism 106 which can enable the VMSS 118 to identify users, such as callers and recipients, when they access the VMSS 118.

Figure 2:
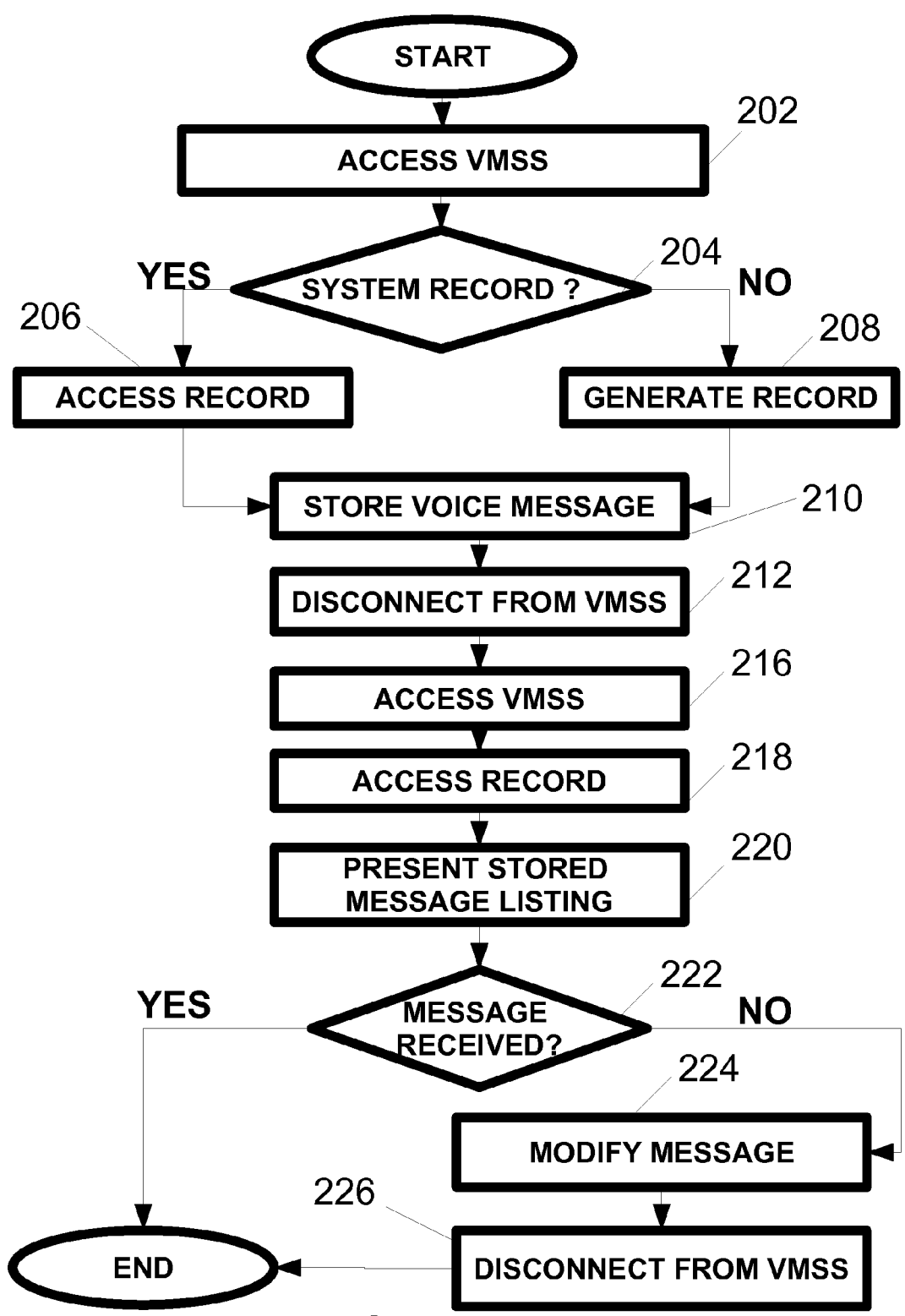
FIG. 2 illustrates a flowchart of a process for modifying a voice message recorded via the system of the present invention.

FIG. 2 illustrates a flowchart of a process for modifying a voice message left with the VMSS 118. A caller can place a call to a recipient and if the recipient does not answer the call, the VMSS 118 can be accessed to enable its messaging functionality (step 202). The caller's device 110 can be connected to the VMSS 118 via a network 116, which can be any communication network, such as, but not limited to, a public switched network, a mobile network, the Internet, or the like. The VMSS 118 can determine if its database 108 contains a system record associated with the caller via an identification mechanism 106 (step 204). In one embodiment, the system record is a device record 102. A device record can be identified via identification information associated with a user's device 110. The VMSS 118 can identify a device record via any device identifier, such as a phone number, mobile identification number (MIN), electronic serial number (ESN), subscriber identity module (SIM) data, or the like. In one scenario, identification mechanism 106 can include a caller ID mechanism to determine the phone number associated the user's device 110. In another embodiment, the system record is a user record 104. A user record 104 can be identified via identification information associated with the user himself. For example, a user record can be located via a registered pass phrase, personal identification number, biometric data, or the like.

If the VMSS 118 determines it has a system record associated with the caller, it accesses the record (step 206). If the VMSS 118 does not have a system record for the caller, it can generate one (step 208). For example, the VMSS 118 may automatically store an obtained device identifier and create a device record 102 or the VMSS 118 may prompt the caller for identification information and store it in association with a user record 104. The caller can then record a voice message 112 via recording mechanism 120 and the voice message 112 can then be stored in association with the caller's system record and the system record of the recipient (step 210). The caller may then hang up and disconnect from the VMSS 118 (step 212).

If the caller subsequently desires to modify the recorded voice message or determine whether it has been received, he can call the recipient again and, if the recipient does not answer the call, the VMSS 118 can be accessed (step 216) and it can once again determine if its database 108 contains a record associated with the caller (step 218). Alternatively, instead of calling the recipient's phone number again, the caller may connect directly to the VMSS 118. An individual may access the VMSS 118 directly whenever he wishes to modify a recorded message or check on the status of a message. In one embodiment, when a user calls a recipient employing the VMSS 118, before the called number rings, the caller may be given an opportunity to indicate whether the call being made should be treated as a new call or as a call to manage previously left messages. In another embodiment, the caller may contact the VMSS 118 directly via a VMSS phone number. The VMSS phone number may be provided to callers by the VMSS 118 whenever users leave messages. For example, the VMSS 118 may play an audio message stating, "Thank you for using our service. If you would like to modify your message later, please call 1-800-VOICE-MAIL." Alternatively, the VMSS phone number may be one made publicly known. For example, the VMSS phone number may be a number such as "211," thereby being similar to the number for directory assistance, "411."

Once accessed again, the presentation mechanism 122 of VMSS 118 can present, via the caller's device 110, a listing of one or more messages the caller has recorded (step 220). In one scenario, the presentation mechanism 122 may enable the presentment of an audio message listing his recorded messages. Alternatively, if the device 110 has a graphical user interface (GUI), the listing of recorded messages may be displayed visually. In one scenario, the listing may only contain the messages associated with the recipient's phone number. Alternatively, the caller can be presented with a listing of messages for multiple recipients employing the VMSS 118. The VMSS 118 can indicate whether a message has been received by the recipient (step 222). If the caller has left more than one message, the VMSS 118 can indicate which ones have been listen to and which have not. In one scenario, received messages are not included in the listing provided. In another scenario, the VMSS 118 may explicitly indicate which voice messages have been received. For example, an audio listing may include an audio message that a voice message was received. For a visual listing, a graphical image, such as a particular icon, may indicate that a message has been received. If the desired message has not been received, the caller can select it and then modify it (step 224). For example, the caller may delete the message and, if desired, re-record a new one. Alternatively, the caller may add an amendment to his previous message. This amendment can be played to the recipient immediately following the original message or the recipient may be allowed to listen to it at his leisure. For example, after the recipient listens to the original message, he may be informed that there is an amendment and be given the option to listen to the amendment now or later. Once the caller is satisfied with his modification, he may disconnect from the VMSS 118 (step 226).

In one embodiment, the VMSS 118 can share data regarding a voice message's modifications with the recipient. For example, the VMSS 118 may maintain a log of modifications and enable a recipient to determine if a voice message had been modified and, if so, when (e.g., time and date), how many times, and the like. The VMSS 118 may enable a recipient to determine if a voice message has been deleted (rather than amended). The VMSS 118 may allow recipients to set one or more preferences regarding how their voice messages can be modified. For example, a user may opt to prohibit callers from making modifications of any type. A user may establish universal preferences or may set preferences for individual callers. For example, a user may prohibit modifications to voice messages from a particular phone number, while allowing them for voice messages from any other phone number.

Figure 3:
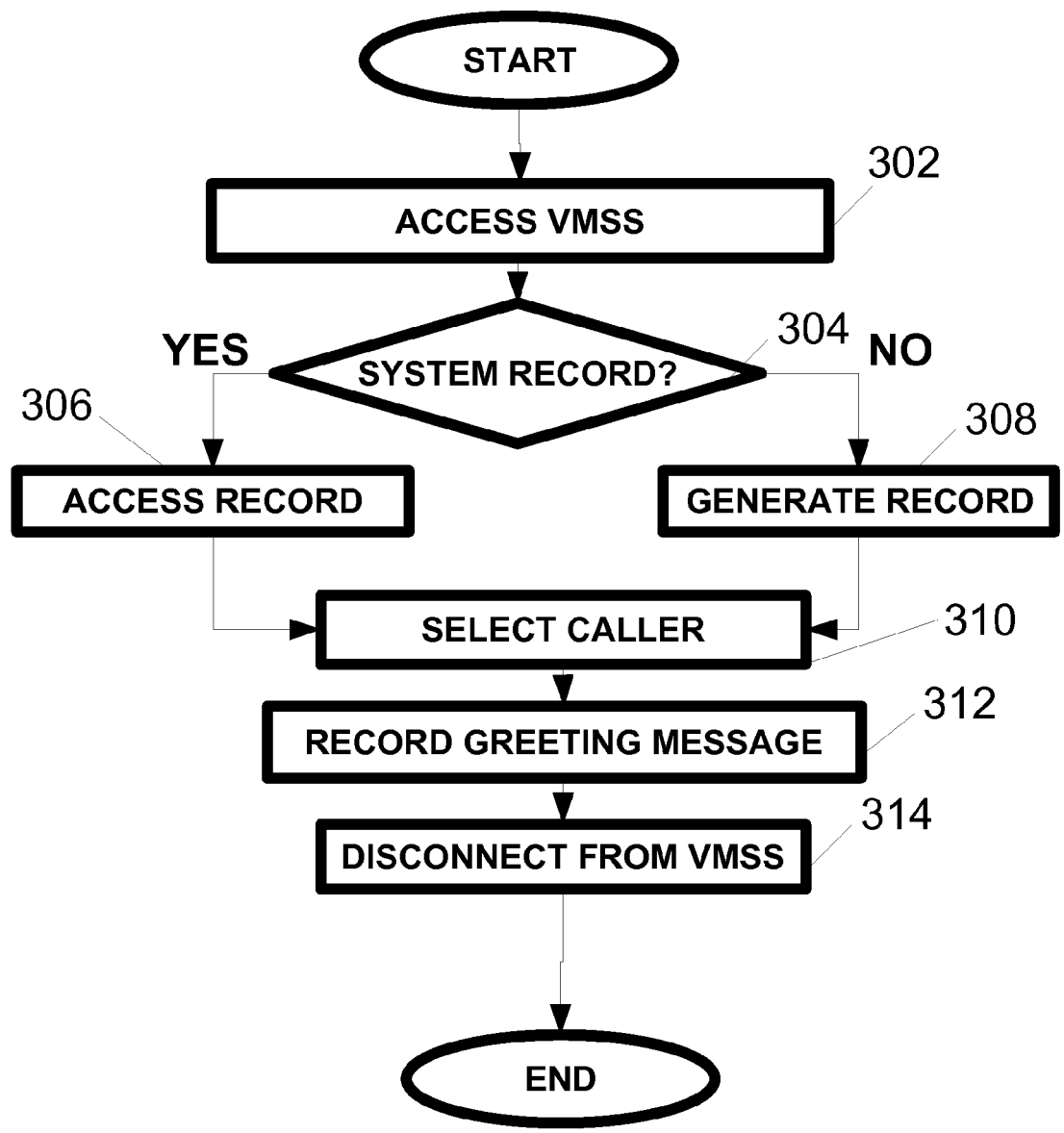
FIG. 3 illustrates a flowchart of a process for creating and enabling a caller-specific greeting message via the system of the present invention.

As illustrated by FIG. 3, a user can employ the VMSS 118 to configure caller-specific greeting messages. As used herein, a "greeting message" is a message that is to be played to a caller when the caller cannot reach the user. A user can access the VMSS 118 by placing a call to the VMSS 118 (step 302). The VMSS 118 attempts to identify the appropriate system record. A system record can be identified (and generated if need be) via a process similar to the one previously discussed (steps 304-308). In one embodiment, a system record can be employed for both caller and recipient functionality. Once the user has accessed his record, he can be presented with an audio or visual listing of callers he has identified as contacts and he can select the desired caller (step 310). If the desired caller is not listed, the user can provide the VMSS 118 with the necessary caller information, such as a phone number. In one embodiment, once the VMSS 118 has received caller information (e.g., a phone number) from the user, the VMSS 118 may search its records to determine if the information is associated with an existing system record and, if so, note the relationship within its own records. Once the user has selected the desired caller, he can record a greeting message 114 specific to the caller (step 312). The user may then disconnect from the VMSS 118 (step 314).

Figure 4:
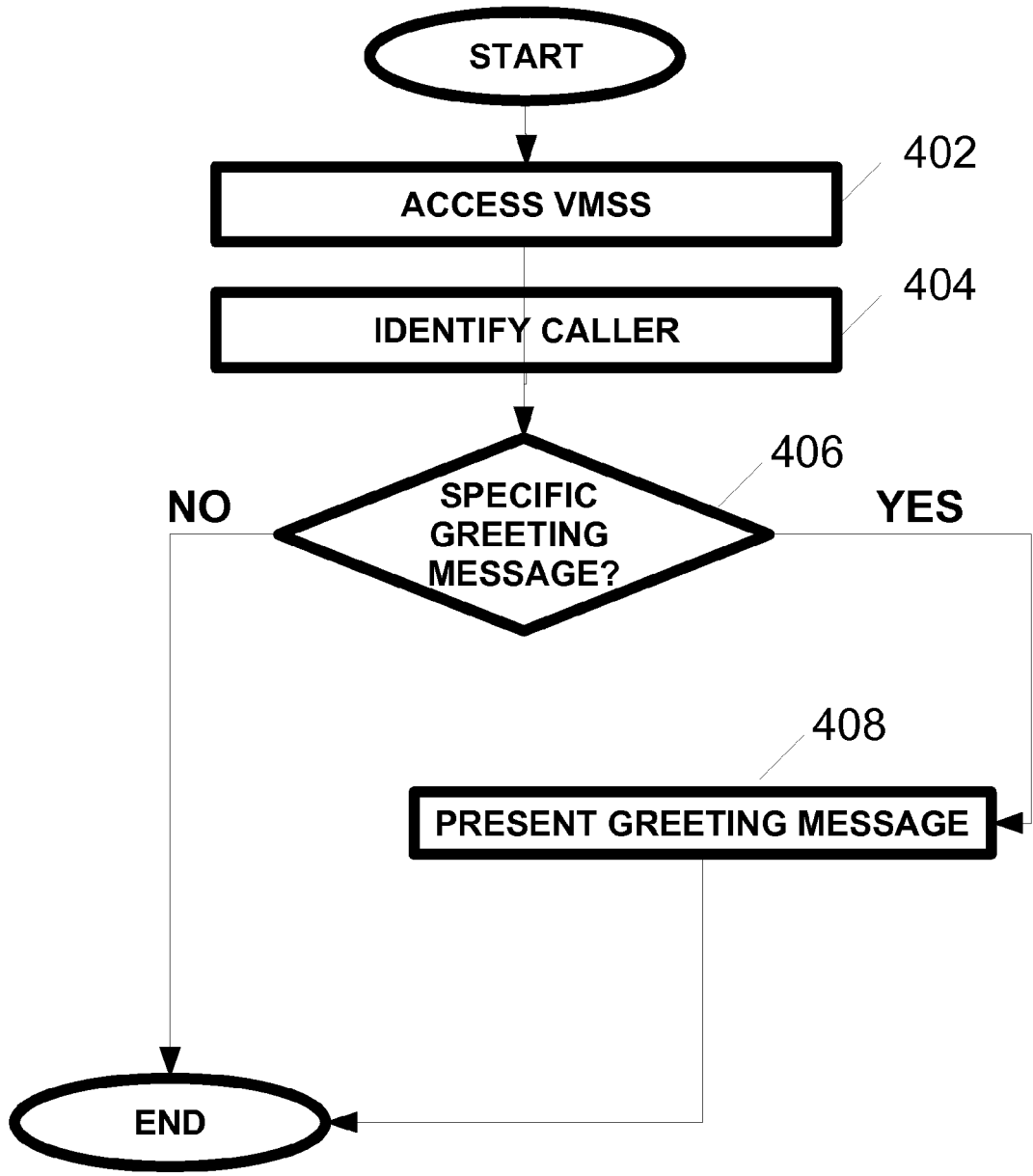
FIG. 4 illustrates a flowchart of a process for distributing a caller-specific greeting message via the system of the present invention.

The VMSS 118 can then distribute the caller-specific greeting message 114, such as illustrated by FIG. 4. When the VMSS 118 is accessed by a caller (step 402), it can identify the caller, such as via caller ID or the other aforementioned processes (step 404), determine whether a greeting message 114 has been specifically recorded for him (step 406), and, if so, present it (step 408). In one embodiment, before presenting the greeting message 114, the VMSS 118 may determine whether the greeting message 114 has already been presented to the caller and, if so, refrain from presenting the greeting message 114 again. This may ensure that the caller does not repeatedly hear the same greeting message 114. The VMSS 118 may also provide the caller with the option of hearing a previously presented greeting message 114.

Additionally, a user can establish priority settings for his contacts in order to customize the order in which voice messages are presented. For example, a user can select a contact and assign him a particular priority rating. When the VMSS 118 stores a voice message from this contact, it can then prioritize the voice message according to the rating. For example, an individual may assign his wife a priority setting and the VMSS 118 may present her voice messages before any others. In one scenario, voice messages from contacts that have no assigned priority are presented in the order they were received after prioritized messages have been presented. The priority rating assigned to a contact may remain until changed by the user or it can be a limited-time priority rating. For example, a user may be expecting a call from a particular contact and assign that contact a high priority rating for a limited time (e.g., for an hour, for the next message received from the contact, etc.).

In one embodiment, the VMSS 118 may interact with a user's device 110 via an electronic address book mechanism. The VMSS 118 can be configured to interact with an existing electronic address book mechanism or an electronic address book mechanism specifically designed for the VMSS 118 can be employed by the device 110. In one scenario, the VMSS 118 can employ the phone numbers registered in the address book as system record identifiers. For example, a user may scroll to a contact saved in his address book, select the contact, and then be connected to the VMSS 118 so that he can record a greeting message specifically for that contact or modify a voice message he has left for that contact.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

What is claimed is:

1. A method for recording a voice message in a voice messaging system, the method comprising:
   receiving, during a first call session, from a caller a first voice message recording request at a voice message server, wherein the first voice message recording request includes caller identification information and recipient identification information;
   locating a caller voice message system record maintained with the voice message server in association with the caller identification information;
   locating a recipient voice message system record maintained with the voice message server in association with the recipient identification information;
   recording a voice message received from the caller;
   storing a voice message in association with the caller voice message system record and the recipient voice message system record;
   receiving, during a subsequent call session, from the caller a second voice message recording request at the voice message server, wherein the second voice message recording request includes the caller identification information and the recipient identification information;
   locating the previously stored voice message; and
   modifying the previously stored voice message.

2. The method of claim 1, wherein locating a caller voice message system record comprises determining the existence of a caller voice message system record and, if no caller voice message system record exists, generating a caller voice message system record.

3. The method of claim 1, further comprising notifying the caller of whether the stored voice message has been received by the recipient.

4. The method of claim 1, wherein modifying the previously stored voice message comprises one or more of the following: amending the previously stored voice message, deleting the previously stored voice message, and re-recording the previously stored voice message.

5. The method of claim 1, further comprising notifying the recipient of a modification to the previously stored voice message.

6. The method of claim 1, further comprising presenting the voice message to the recipient.

7. The method of claim 6, wherein the presenting of the voice message to the recipient is performed in accordance with a priority setting established by the recipient.

8. A method for recording a greeting message in a voice messaging system, the method comprising:
   receiving from a user a greeting message recording request at a voice message server, wherein the greeting message recording request includes identification information that identifies the user and identification information that identifies a specific caller;
   locating a voice message system record associated with the user maintained with the voice message server in association with the received identification information that identifies the user;
   locating a voice message system record associated with the specific caller maintained with the voice message server in association with the identification information that identifies the specific caller;
   recording a greeting message to be presented to the specific caller;
   storing the greeting message in association with the voice message system record of the user and the voice message system record of the specific caller;
   locating the previously stored voice message; and
   modifying the previously stored voice message.

9. The method of claim 8, further comprising presenting the user with a listing of callers.

10. The method of claim 8, wherein locating a voice message system record associated with the specific caller comprises determining the existence of a specific caller voice message system record and if no specific caller voice message system record exists, generating a specific caller voice message system record.

11. The method of claim 8, further comprising:
receiving a greeting message presentation request at the voice message server from the specific caller, wherein the greeting message presentation request includes identification information that identifies the specific caller and identification information that identifies the user;
locating the greeting message stored in association with the voice message system record of the user and the voice message system record of the specific caller; and
presenting the greeting message to the specific caller.

12. A system for the recording of voice messages, the system comprising:
a remote voice message server configured to:
record, during a first call session, a voice message received from a caller via a communication device;
store the voice message in association with a voice message system record, wherein the voice message system record is identified by identification information associated with the caller and wherein the stored voice message is enabled to be presented to a recipient;
identify, during a subsequent call session, the voice message system record via the identification information associated with the caller, thereby enabling the locating of a set of previously stored voice messages associated with the caller;
present the set of previously stored voice messages to the caller; and
modify a previously stored voice message per an instruction received from the caller.

13. The system of claim 12, wherein the identification information associated with the caller is associated with the communication device.

14. The system of claim 13, wherein the identification information comprises one or more of the following: a phone number, mobile identification number, electronic serial number, and subscriber identity module data.

15. The system of claim 12, wherein the identification information associated with the caller is associated with an individual.

16. The system of claim 15, wherein the identification information comprises one or more of the following: a pass phrase, a personal identification number, and biometric data.

17. The system of claim 12, wherein the voice message server is further configured to record a caller-specific greeting message for a contact selected from a set of contacts.

* * * * *